April 9, 1929. G. F. MICHAEL 1,708,023

BRAKE OPERATING MECHANISM

Filed Sept. 13, 1926

INVENTOR
GUS F. MICHAEL
BY
M. W. McConkey
ATTORNEY

Patented Apr. 9, 1929.

1,708,023

UNITED STATES PATENT OFFICE.

GUS F. MICHAEL, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MECHANISM.

Application filed September 13, 1926. Serial No. 134,962.

This invention relates to brakes and is illustrated as embodied in novel operating mechanism for a front wheel automobile brake. An object of the invention is to provide, in a brake control supported at one end on the chassis frame, for unusual movement of the frame due to the action of the vehicle springs, by providing on the frame a pivotal support permitting the shifting of a joint slidably supporting the inner end of a brake-applying shaft.

The above and other objects and features of the invention, including various novel and desirable details of construction, will be apparent from the following description of one illustrative embodiment shown in the accompanying drawing, in which.

Figure 1:
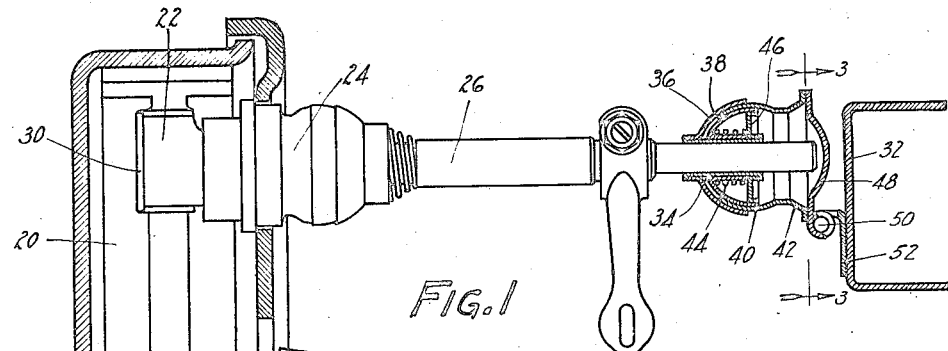
Figure 1 is a vertical section through one front brake and through associated parts, showing the brake control in rear elevation.

In the arrangement illustrated the brake includes a drum 10 rotatably mounted with a wheel (not shown) on the spindle 12 of a knuckle 14 which is swivelled by a kingpin 16 or the like at one end of the front axle 18. The brake shown includes shoes 20 arranged inside of the drum and applied by means such as a double cam 22 operated through a suitable universal joint 24 by a brake-applying shaft 26, and the open side of the drum 10 may be closed by a suitable backing plate 28. The particular brake illustrated is substantially the same as that fully described in Patent No. 1,567,716, granted Bendix Brake Company December 29, 1925, on an application of A. Y. Dodge, except that the free ends of the brake shoes are confined laterally by a flange 30 formed on one end of the cam 22.

The present invention relates to the novel means for supporting the inner end of the shaft 26. Preferably the inner end of this shaft is to be supported on a chassis member, such as the side member 32 of the chassis frame supported by the usual vehicle springs on the front axle 18 and on a rear axle (not shown).

The inner end of the shaft 26 is preferably slidably supported in a sleeve 34, to permit axial movement to compensate for distortion of the vehicle springs. The sleeve 34 is arranged within an outer hemispherical stamping 36 and an inner hemispherical stamping 38 embracing a generally spherical support 40 which is preferably formed as an integral extension of a base 42. The hemispherical stampings 36 and 38 are yieldably urged against the opposite sides of the support 40 by a spring 44 confined between the inner hemispherical stamping 38 and the diaphragm 46 carried on the end of the sleeve 34. Sleeve 34 has flanges at its opposite ends to engage stamping 36 and diaphragm 46.

Figure 2:
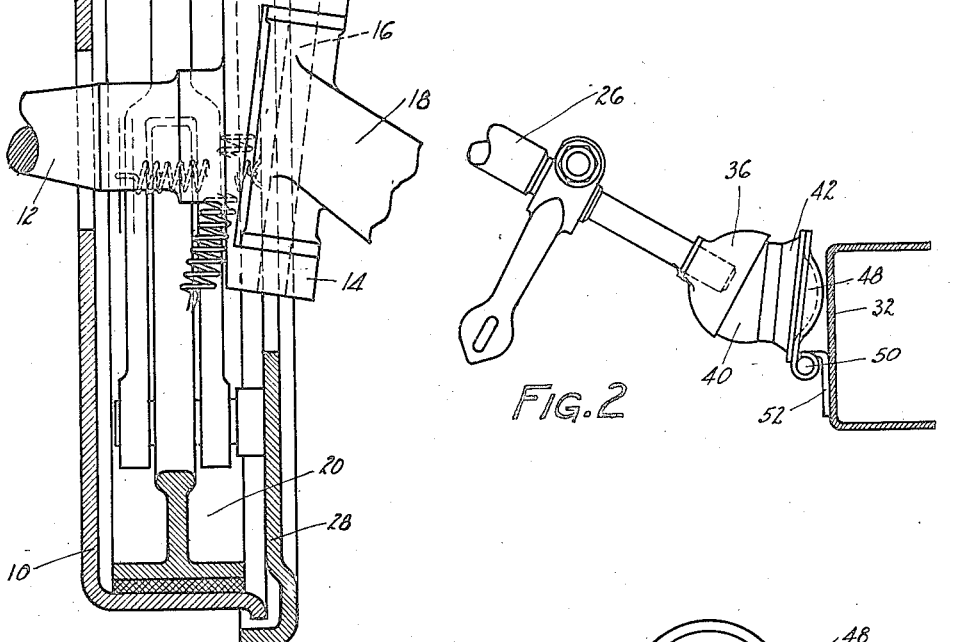
Figure 2 is a view corresponding to part of Figure 1 but showing the positions of certain of the parts when the vehicle spring is very greatly distorted.
Figure 3:
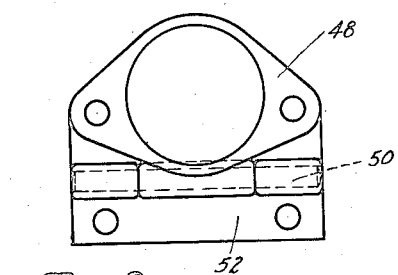
Figure 3 is a section on the line 3—3 of Figure 1 showing the pivotal mounting for the shaft support on the chassis frame.

The base 42 of the above-described slidable and yieldable joint or support for shaft 26 is bolted or riveted or otherwise secured to a dished plate or other support 48 pivotally connected, as for example by a pin 50, to a stamped bracket 52 which is bolted or otherwise secured to the side frame member 32. By this arrangement, when the vehicle springs are distorted in an excessive degree, the entire universal and slidable joint or support may swing about the pin 50 as shown in Figure 2 to give greater angular movement than is ordinarily possible with a joint of this type.

While one illustrative embodiment of the invention has been described in detail, it is not my intention to limit its scope to that particular embodiment or otherwise than by the terms of the appended claims.

I claim:

1. A support for a brake-applying shaft comprising, in combination, a universal joint including a sleeve for holding the end of a brake-applying shaft in a manner permitting the shaft to move axially, a bracket adapted to be secured to a chassis frame, and means for pivotally mounting the joint on the bracket.

2. A support for a brake-applying shaft comprising, in combination, a universal joint including a sleeve for holding the end of a brake-applying shaft in a manner permitting the shaft to move axially, a bracket adapted to be secured to a chassis frame, and means for pivotally mounting the joint on the bracket, for movement about a horizontal axis paralleling the side of the chassis frame.

In testimony whereof, I have hereunto signed my name.

GUS F. MICHAEL.